May 26, 1925. 1,539,582
J. A. LANDRY
TRACTION DEVICE
Filed April 19, 1924  2 Sheets-Sheet 1
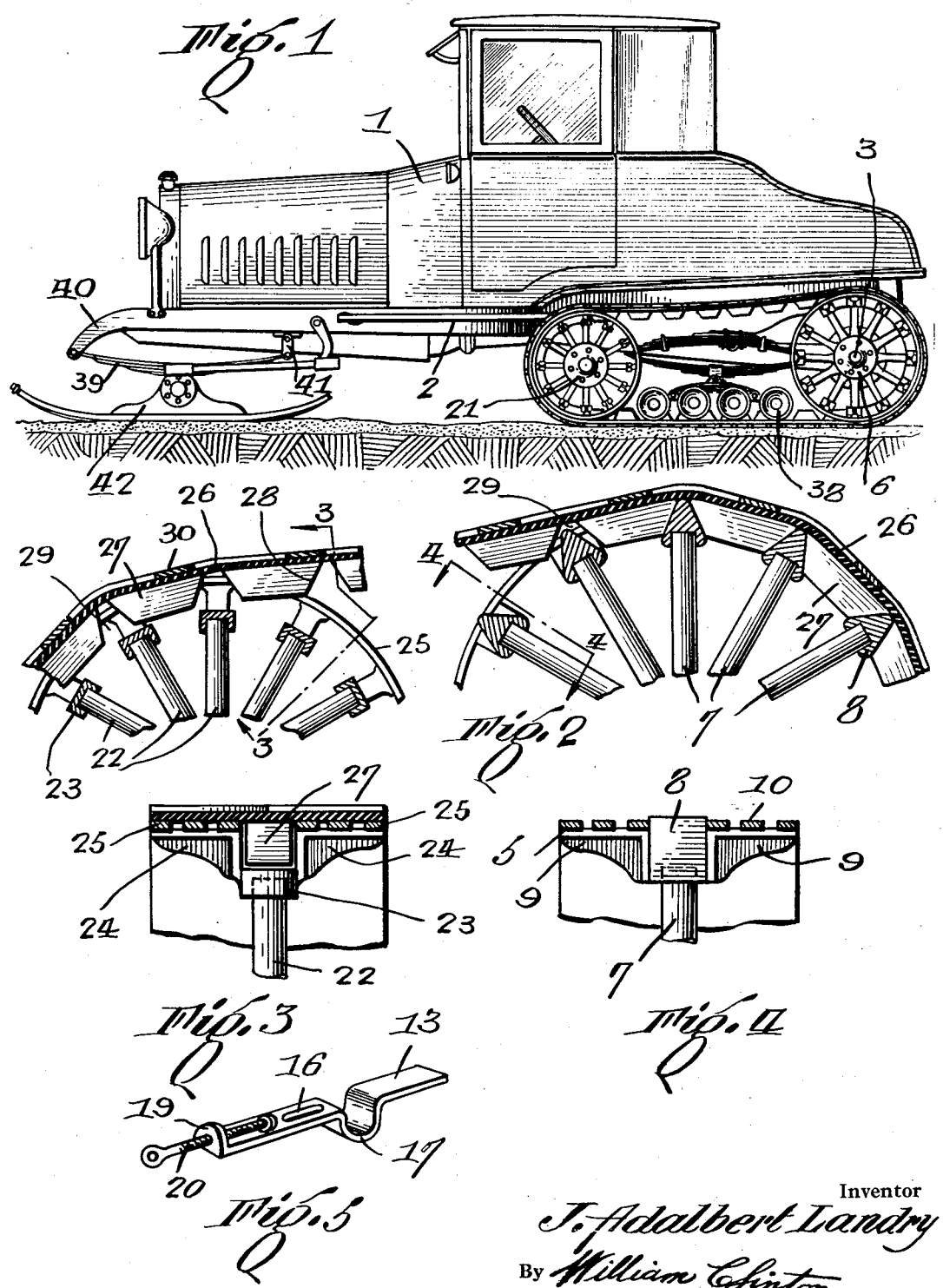
Inventor
J. Adalbert Landry
By William Clinton
Attorney

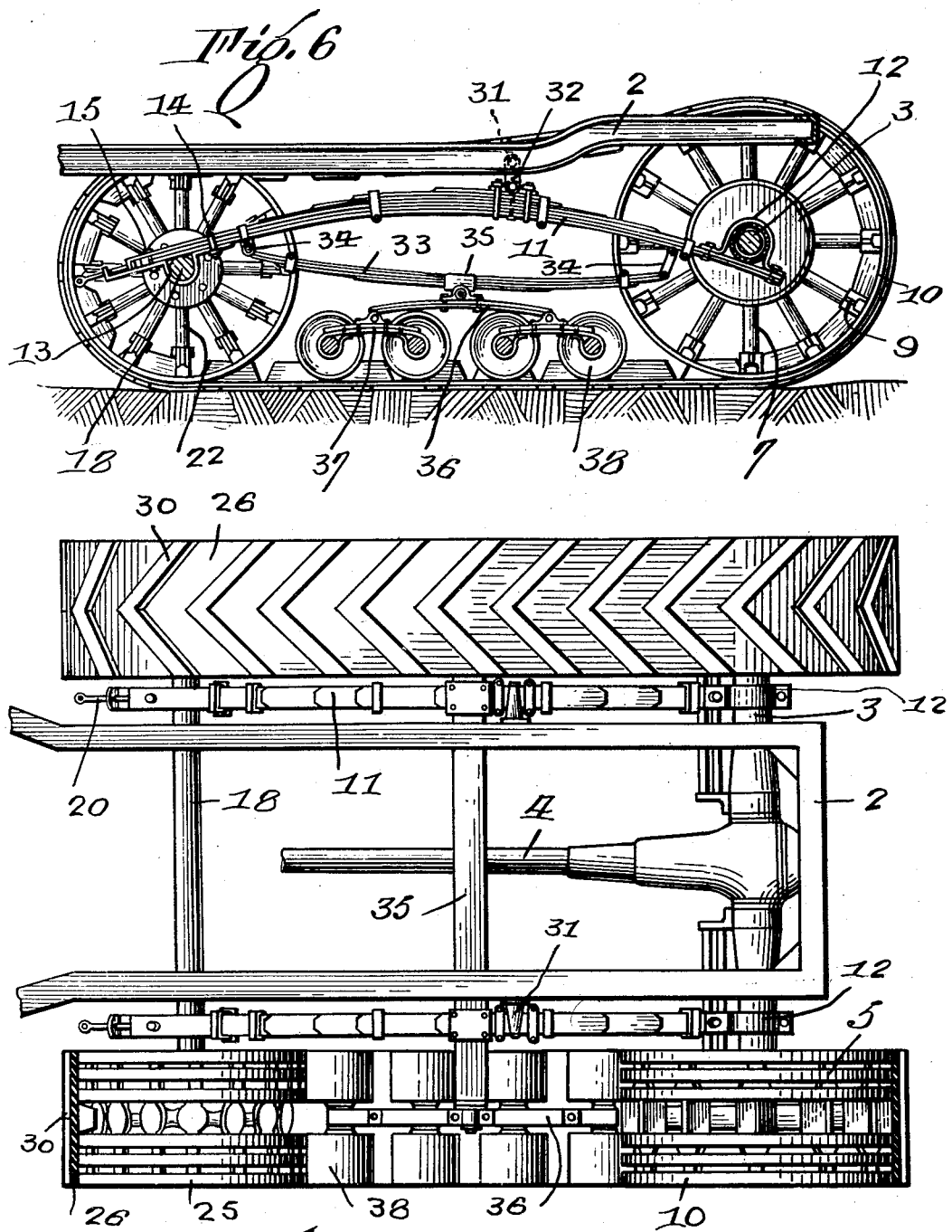

Patented May 26, 1925.

1,539,582

UNITED STATES PATENT OFFICE.

JOSEPH ADALBERT LANDRY, OF MONT JOLI, QUEBEC, CANADA.

TRACTION DEVICE.

Application filed April 19, 1924. Serial No. 707,732.

*To all whom it may concern:*

Be it known that I, JOSEPH ADALBERT LANDRY, a subject of the King of Great Britain, residing at Mont Joli, Province of Quebec, Canada, have invented certain new and useful Improvements in Traction Devices; and I do hereby declare that the following is a full, clear, and exact description of the invention, such as will enable others skilled in the art to which it appertains to make and use the same.

The present invention pertains to traction devices and consists of improvements on the devices comprising the subject matter of my United States application No. 682,565, filed December 24th, 1923, and Canadian application No. 276,631, filed April 23rd, 1923.

One of the objects of the invention is the provision of a novel construction for the engagement of the tread members with the traction wheels. As in my previous invention, the device comprises in general a pair of axles connected by springs and drive wheels carried at the ends of these axles. The spokes of the rear wheels carry heads, while the spokes of the forward wheels carry spaced wings. The tread member surrounding the forward and rear wheels carries a number of spaced blocks at its inner surface, and these spokes are so arranged as to receive the heads of the rear wheel therebetween and to pass between the spaced devices provided on the forward wheel. In this manner the tread member is positively actuated by the rear wheels but has no locking engagement with the forward wheels, as a consequence of which the movement of the tread member is unobstructed.

A further feature of the invention is the disposition of a number of guide rollers engaging the lower lip of the tread member and disposed between the forward and rear wheels. These rollers occur in pairs, each pair being pivotally carried by a relatively small spring, which is pivotally attached to an auxiliary spring, which in turn is connected to the above mentioned main spring between the axles. The object of this construction is to hold the four rollers in constant contact with the tread member, which will follow the inequalities of the road surface, and render complete traction at all times. The manner in which this object is accomplished by the disclosed device is pointed out below.

The invention is fully disclosed in the following description and in the accompanying drawings in which:

Figure 1 is a side elevation of an automobile equipped with the invention;

Figure 2 is a fragmentary longitudinal section of the device constructed in accordance with the invention;

Figure 3 is a section on the line 3—3 of Figure 2;

Figure 4 is a section on the line 4—4 of Figure 2;

Figure 5 is a perspective view of the bracket;

Figure 6 is a detail elevation of the device; and,

Figure 7 is a plan view thereof applied to an automobile.

Reference will now be had to these views by means of like characters which are employed to designate corresponding parts throughout. The numeral 1 indicates the body of an automobile of any desired construction mounted upon a chassis or frame 2 shown in Figures 6 and 7. At the rear end of the frame is provided a rear axle 3 driven from a transmission shaft 4 in the usual manner. On the ends of the axle are mounted wheels indicated in general by the numeral 5. Since the two wheels are identical, a description of one will suffice; and the same method of description will prevail since both sides of the entire structure are similar.

The rear wheel 5 comprises a hub 6 from which radiate a plurality of spokes 7. The outer end of each spoke carries a head 8 from the sides of which extend a pair of wings 9. The wings at each side of the heads are engaged by bands 10 thus forming a comparatively wide wheel as may be seen from Figure 7. The bands are spaced from each other in order to permit passage of snow therebetween.

The main spring 11 extends forwardly from the axle 3, the rear end of the spring being secured to the axle by means of a clip 12. The forward end of the spring carries a bracket bearing 13 attached thereto by means of a strap 14 and bolt 15 passing through the spring and through a slot 16 in the body of the bracket. The bearing portions 17 of the bracket support the ends of an intermediate shaft 18. At the forward end of the bracket is provided a lip 19 through which is threaded a set screw 20 engaging the forward extremity of the spring 11. By means of these screw devices the position of the brackets with reference to the main springs may be varied, whereby the distance between the intermediate shaft 18 and rear axle 3 is likewise adjusted.

Each end of the intermediate shaft 18 carries a forward wheel comprising a hub 21 from which extend a plurality of radial spokes 22. Each spoke carries at its outer end a collar 23 provided with a pair of lateral wings 24 elevated with respect to the collar as will be shown in Figure 3. The wings are surrounded by bands 25, in the same manner as the construction described in connection with Figure 4.

The forward and rear wheels at each side of the device are surrounded by a tread member the body of which is a belt of rubber or similar resilient material. The inner surface of the belt 26 carries a plurality of blocks 27, the ends of which are inclined inwardly as indicated by the numeral 28 to form substantially V-shaped spaces 29. In the movement of the tread member with the wheels, these spaces receive the heads 8 of the rear wheels and enter the spaces 29 between the wings 24 of the forward wheels as clearly shown in Figure 3. The outer surface of the belt is provided with a plurality of V-shaped gripping members 30 which may consist of canvas or other suitable material.

The main springs 11 are further attached to the chassis 2 by means of brackets 31 extending laterally from the sides of the latter and carrying suspension links 32 pivotally connected to the springs, as shown in Figure 6. Beneath each spring 11 is provided an auxiliary spring 33 connected thereto by means of pivoted devices 34 at the ends. Across the backs of the springs 33 is disposed a cross bar 35 which serves to support pivotally smaller springs 36 at its ends. Each smaller spring 36 has pivoted to both ends thereof roller carrying springs 37. At the ends of the latter are journaled auxiliary rollers 38 which engage the lower lip of the tread belt as clearly shown in Figures 1 and 6. Due to the presence of the springs 36 and the fact that two rollers are carried at the end of each spring, it is assured that the four rollers will be in spring pressed engagement with the tread member regardless of the position of the members 37 with respect to their pivot points. There is thus provided an arrangement which is automatically adjusted and compensated for all irregularities or obstructions existing in the road bed traversed by the device.

At the forward end of the vehicle, the wheels are removed, and springs 39 are maintained between the goosenecks 40 and links 41 depending from the sides of the frame. To the backs of the springs 39 are attached runners 42 as shown in Figure 1.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. A traction device comprising in combination with a pair of axles, springs connecting said axles, wheels mounted on the ends of said axles, wheels on the rear axle comprising a hub and a plurality of spokes, heads carried at the free ends of said spokes, wings extending from said heads, bands surrounding said wings, and a tread device passed around said forward and rear wheels and adapted for locking engagement with said heads.

2. A traction device comprising in combination with a pair of axles, springs connecting said axles, forward wheels carried at the ends of one of said axles, rear wheels carried at the ends of the remaining axle, each of said wheels comprising a hub and a plurality of spokes radiating therefrom, heads carried at the ends of the spokes of the rear wheels, tread members passed around said forward and rear wheels, spaced blocks carried by said members and adapted for locking engagement with said heads, spaced wings carried by the spokes of the forward wheels and adapted for the passage of said blocks therebetween.

3. A traction device comprising in combination with a pair of axles, springs connecting said axles, one of said axles carrying forward wheels at its ends and the remaining axle carrying rear wheels at its ends, each of said wheels comprising a hub and a plurality of spokes radiating therefrom, heads carried at the ends of the spokes of the rear wheel, wings extending laterally from said heads, bands surrounding said wings, spaced wings extending from the ends of the hubs of the forward wheels, bands surrounding said wings, a tread belt passed around said forward and rear wheels, spaced blocks carried at the inner surface of said belt and adapted to receive said heads therebetween, said blocks being adapted for passage between the wings of the forward wheels.

4. A traction device comprising in combination with a pair of axles, main springs connecting said axles, wheels carried by said axles, tread members passed around said wheels, auxiliary springs suspended from said main springs, smaller springs carried by said auxiliary springs, roller carrying springs connected to the ends of said smaller springs, and rollers journaled to the ends of said roller carrying springs and engaging said tread members.

5. A traction device comprising in combination with a pair of axles, main springs connecting said axles, wheels carried by said axles, tread members passed around said wheels, auxiliary springs suspended from said main springs, smaller springs carried by said auxiliary springs, roller carrying springs pivoted to the ends of said smaller springs, and rollers journaled to the ends of said roller carrying springs and engaging said tread members.

In witness whereof I have hereunto set my hand.

JOSEPH ADALBERT LANDRY.

Witnesses:
 AUGUSTE ROY,
 J. HENRI BILANGER.